United States Patent [19]
Hirotsune et al.

[11] Patent Number: 5,173,833
[45] Date of Patent: Dec. 22, 1992

[54] CIRCUIT BREAKER WITH DETACHABLE TRIPPING TESTER

[75] Inventors: Kouji Hirotsune; Kazuhiro Ishii, both of Fukuyama, Japan

[73] Assignee: Mitsubishi Denki Kabushiki Kaisha, Tokyo, Japan

[21] Appl. No.: 659,684

[22] Filed: Feb. 25, 1991

[30] Foreign Application Priority Data

Feb. 28, 1990 [JP] Japan ................................ 2-45586

[51] Int. Cl.⁵ .............................................. H02H 1/00
[52] U.S. Cl. ..................................... 361/94; 361/92; 361/96
[58] Field of Search ............................. 361/94, 92, 96

[56] References Cited

U.S. PATENT DOCUMENTS 3,924,160 12/1975 Maier et al. .......................... 361/94
4,105,965  8/1978 Russell ................................. 361/94
4,803,434  2/1989 Walker ................................. 324/424
4,873,603 10/1989 Ishii ..................................... 361/94

FOREIGN PATENT DOCUMENTS 0330148  8/1989 European Pat. Off. .
2254137  7/1975 France .
62-166725  7/1987 Japan .

Primary Examiner—Steven L. Stephan
Assistant Examiner—Thomas M. Dougherty
Attorney, Agent, or Firm—Burns, Doane, Swecker & Mathis

[57] ABSTRACT

In a circuit breaker having an instant time tripping test function, terminals which are connected to an electric power source of a control circuit of the circuit breaker and a quasi over-current signal generating circuit for tripping test are provided on a front face of a housing of the circuit breaker, and a widely usable detachable tripping tester comprising a D.C. power source and a switch is connected to the terminals, thereby a predetermined voltage is applied to the electric power circuit and the quasi over-current signal generating circuit for testing a tripping mechanism.

2 Claims, 3 Drawing Sheets

CIRCUIT BREAKER WITH DETACHABLE TRIPPING TESTER

BACKGROUND OF THE INVENTION

1. Field of the Invention

The present invention relates to a circuit breaker having tripping test function, and especially relates to a circuit breaker having a detachable tripping tester to be used for not only a tripping tester but also a remote controller for manually tripping the circuit breaker.

2. Description of the Prior Art

A conventional circuit breaker having tripping test function, for example, shown in the U.S. Pat. No. 4,873,603 is described referring to FIG. 3. FIG. 3 is a circuit diagram showing the conventional circuit breaker having tripping test function.

In FIG. 3, a connector 11 for testing operation has terminals 11a, 11b, 11c and 11d. The terminal 11a is connected to a negative terminal 5d of an electric power circuit 500. The terminal 11b is connected to the anode of a diode 12 which is for preventing reverse current to the terminals. And the cathode of the diode 12 is connected to a positive terminal 30a of a rectifying circuit 30. The terminal 11c is connected to a first test signal generating circuit 13 and the terminal 11d is connected to a second test signal generating circuit 14.

Terminals 15a, 15b, 15c and 15d are disconnectably connected to the terminals 11a, 11b, 11c and 11d, respectively. The terminal 15a is connected to the negative electrode of a D.C. power source 16. Other terminals 15b, 15c and 15d are respectively connected to switches 17a, 17b and 17c. And the switches 17a, 17b and 17c are connected to the positive electrode of the D.C. power source 16.

Tripping test operation of the above-mentioned conventional circuit breaker is described.

At first, the terminals 15a, 15b, 15c and 15d are connected to the contacts 11a, 11b, 11c and 11d of the connector 11, respectively.

Under the condition that the load break contact 201 is opened and any current does not flow on the A.C. power line 1, when the switch 17a is closed, a predetermined voltage, for example, 24 V is applied to the electric power circuit 500 from the outer D.C. power source 16, and a direct current (D.C.) flows on the electric power circuit 500.

Under the above-mentioned condition, when the switch 17b is closed, a switch 18 is turned to a first D.C. power source 19 by the output of the first test signal generating circuit 13. The voltage from the first D.C. power source 19 is applied to the positive input terminal of a differential amplifier 60 as an input signal and the output signal of the differential amplifier 60 is applied to a time delay circuit 70. Hereupon, since the level of the output signal of the differential amplifier 60 is high, an instant time tripping circuit 230 issues an output in the instant time tripping region as an output of the time delay circuit 70.

On the contrary, when the switch 17c is closed instead of the switch 17b, a switch 22 is turned to a second D.C. power source 20 by the output of the second test signal generating circuit 14. The voltage from the second D.C. power source 20 is applied to the positive input terminal of a differential amplifier 61 as an input signal. And the output signal of the differential amplifier 61 is applied to the time delay circuit 70. Hereupon, since the level of the output signal of the differential amplifier 61 is relatively lower than that of the differential amplifier 60, the long time tripping circuit 170 issues an output of a long time tripping region as an output of the time delay circuit 70.

As is obvious from the above-mentioned configuration, the conventional testing of the instant time tripping characteristic and the long time tripping characteristic in the state of connection of the circuit breaker actually to the power line is executed by following sequential steps of: connecting the terminals 15a, 15b, 15c and 15d to the contacts 11a, 11b, 11c and 11d of the connector 11 respectively for testing operation and turning on the switch 17; supplying the voltage of the D.C. power source 16 to the electric power circuit 500; closing the switch 17b or 17c; turning the switch 18 or 22 to be connected to the D.C. power source 19 or 20 by the output of the first or second test signal generating circuit 13 or 14; and applying the output voltage of the first or second D.C. power source 19 or 20 as a quasi input signal to the differential amplifier 60 or 61.

Besides, a solid state circuit is used as a control circuit of the circuit breaker and it is known that the solid state circuit is reliable. Accordingly, when the solid state circuit is adopted as a control circuit of the conventional circuit shown in FIG. 3, testing relatively often is necessary only for mechanical operation of the tripping.

The conventional circuit breaker having tripping test function comprises the circuit testing function performed by configuration of the test signal generating circuits 13 and 14, the D.C. power source 19 and 20 and the switches 18 and 22 for testing an instant time tripping operation and a long time or a short time tripping operation. Therefore, the complexity and the expensiveness of the control circuit of the conventional circuit breaker shown in FIG. 3 become its disadvantage. Furthermore, the disconnectable unit consisting of the D.C. power source 16, the switches 17a-17c and the terminals 15a-15d are exclusively for the circuit of FIG. 3, and the unit can not be used in another circuit breaker having different constitution from the circuit shown in FIG. 3.

SUMMARY OF THE INVENTION

Purpose of the present invention is to provide an improved circuit breaker with detachable tripping tester, wherein the tripping tester has the simplified constitution and is compatible in another circuit breaker having different constitution for tripping test.

A circuit breaker with detachable tripping tester in accordance with the present invention comprises:

first and second terminals provided on a surface of a housing of the circuit breaker, the first terminal being connected to a negative terminal of an electric power source of the circuit breaker, the second terminal being connected to the anode of a diode and the cathode of the diode being connected to a positive terminal of the electric power source;

a series connection of a tripping coil and a first switch connected between the negative terminal and the positive terminal of the electric power source, an actuator of the tripping coil being linked to a tripping mechanism of the circuit breaker for driving the tripping mechanism when the switch is turned on;

quasi over-current signal generating means connected between the second terminal and the negative terminal of the electric power source for generating a quasi over-current signal for turning on the switch when a predetermined D.C. voltage is applied thereto; and detachable tripping tester having a D.C. power source, a second switch and third and fourth terminals, the third terminal being connected to a negative terminal of the D.C. power source and to be connected to the first terminal, the fourth terminal being connected to a terminal of the second switch and to be connected to the second terminal, and the other terminal of the switch being connected to a positive terminal of the D.C. power source.

The way of tripping test by using the apparatus in accordance with the present invention is as follows. At first, the third and fourth terminals of the detachable tripping tester are connected to the first and second terminals of the circuit breaker, respectively. When the second switch of the detachable tripping tester is turned on, a predetermined D.C. power is applied between the negative and positive terminals of the electric power source of the circuit breaker and the quasi over-current signal generating means (circuit). The quasi over-current generating means turns on the first switch and the tripping coil is excited by the D.C. power, since the series connection of the tripping coil and the first switch is connected to the electric power source of the circuit breaker. When the tripping coil is excited, the tripping mechanism is driven and a switch on an electric power line is disconnected.

DESCRIPTION OF THE PREFERRED EMBODIMENT

Figure 1:
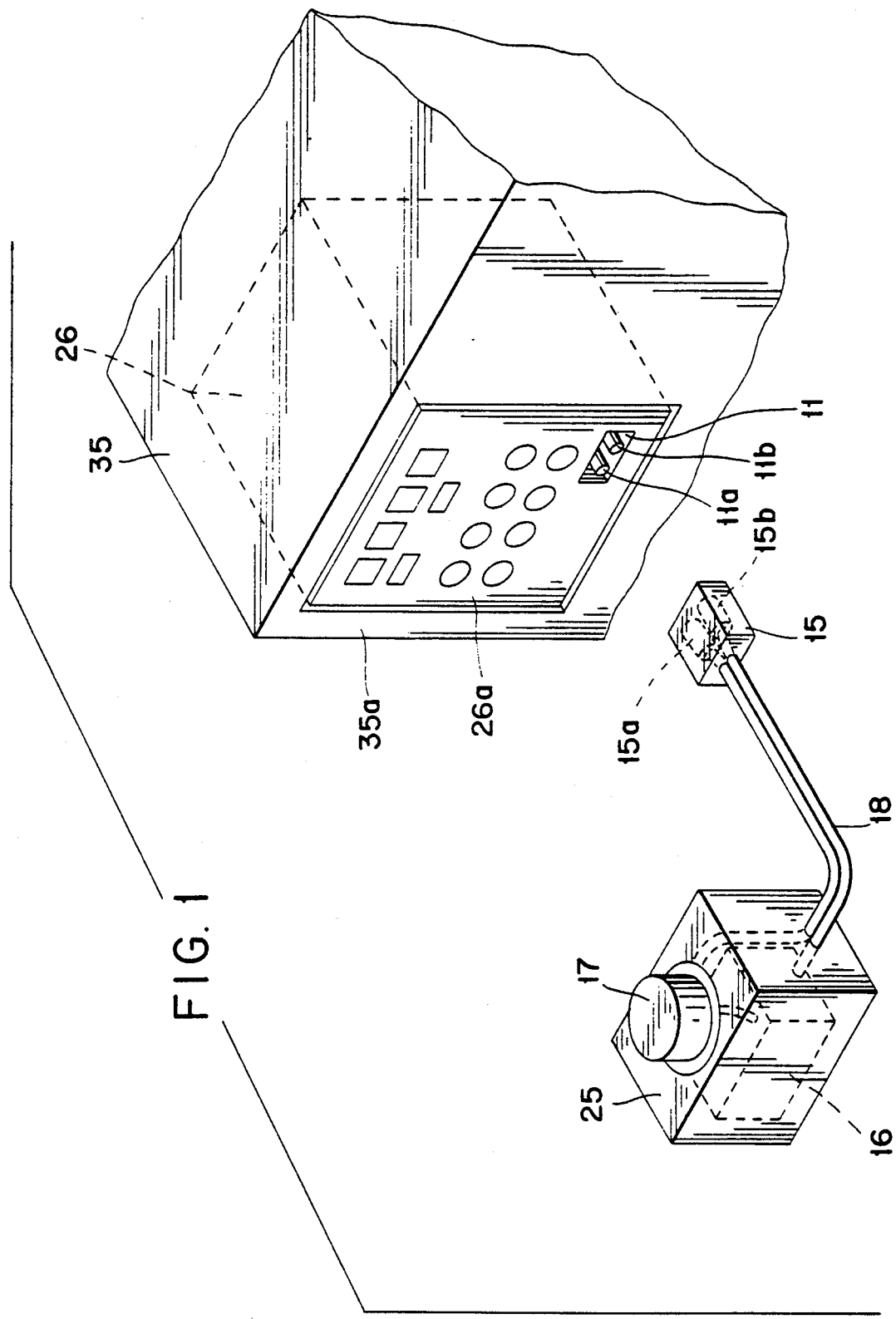
FIG. 1 is a perspective view showing a circuit breaker with detachable tripping tester in accordance with the present invention.
Figure 2:
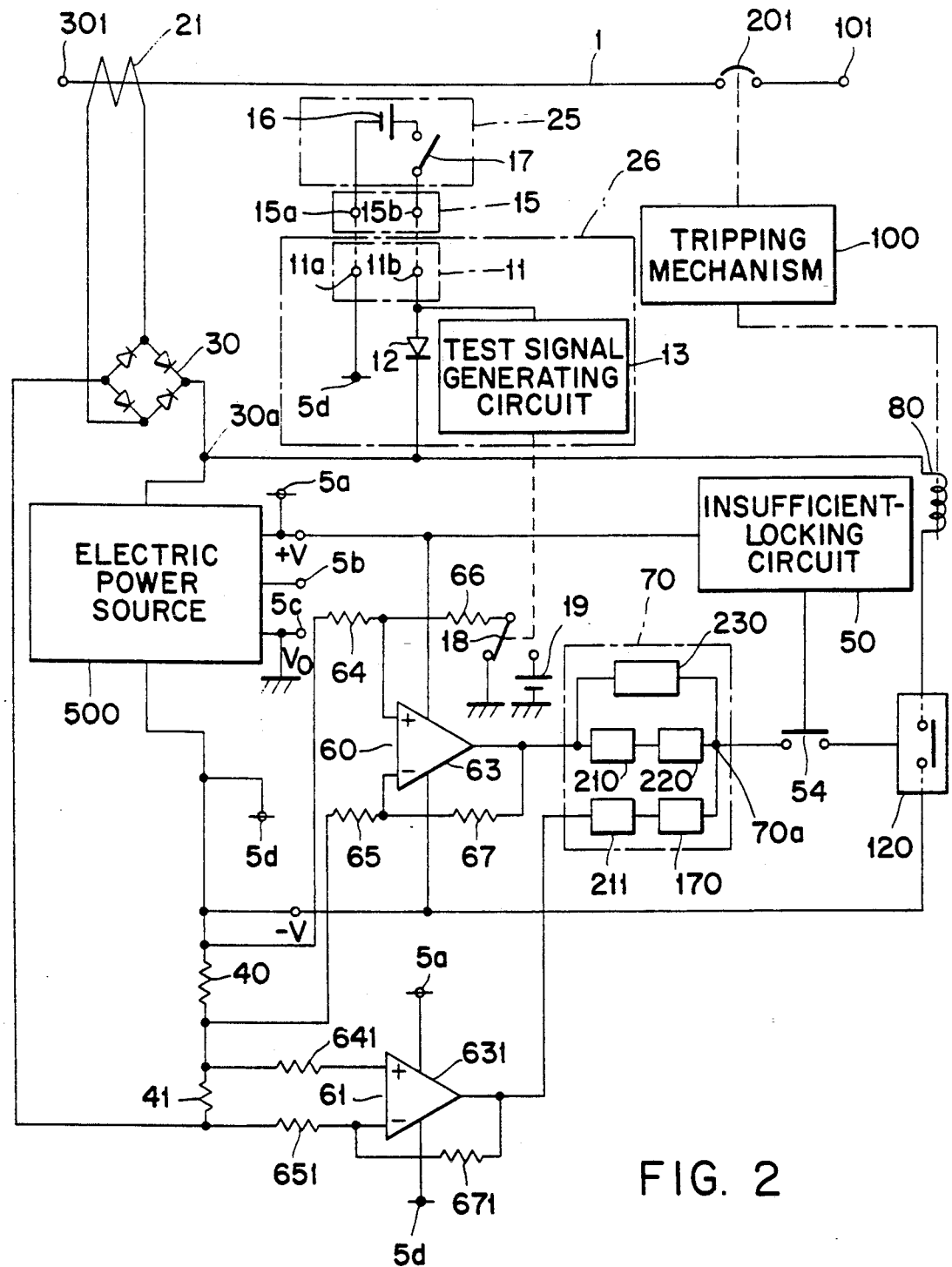
FIG. 2 is a circuit diagram of the circuit breaker with detachable tripping tester in accordance with the present invention.
Figure 3:
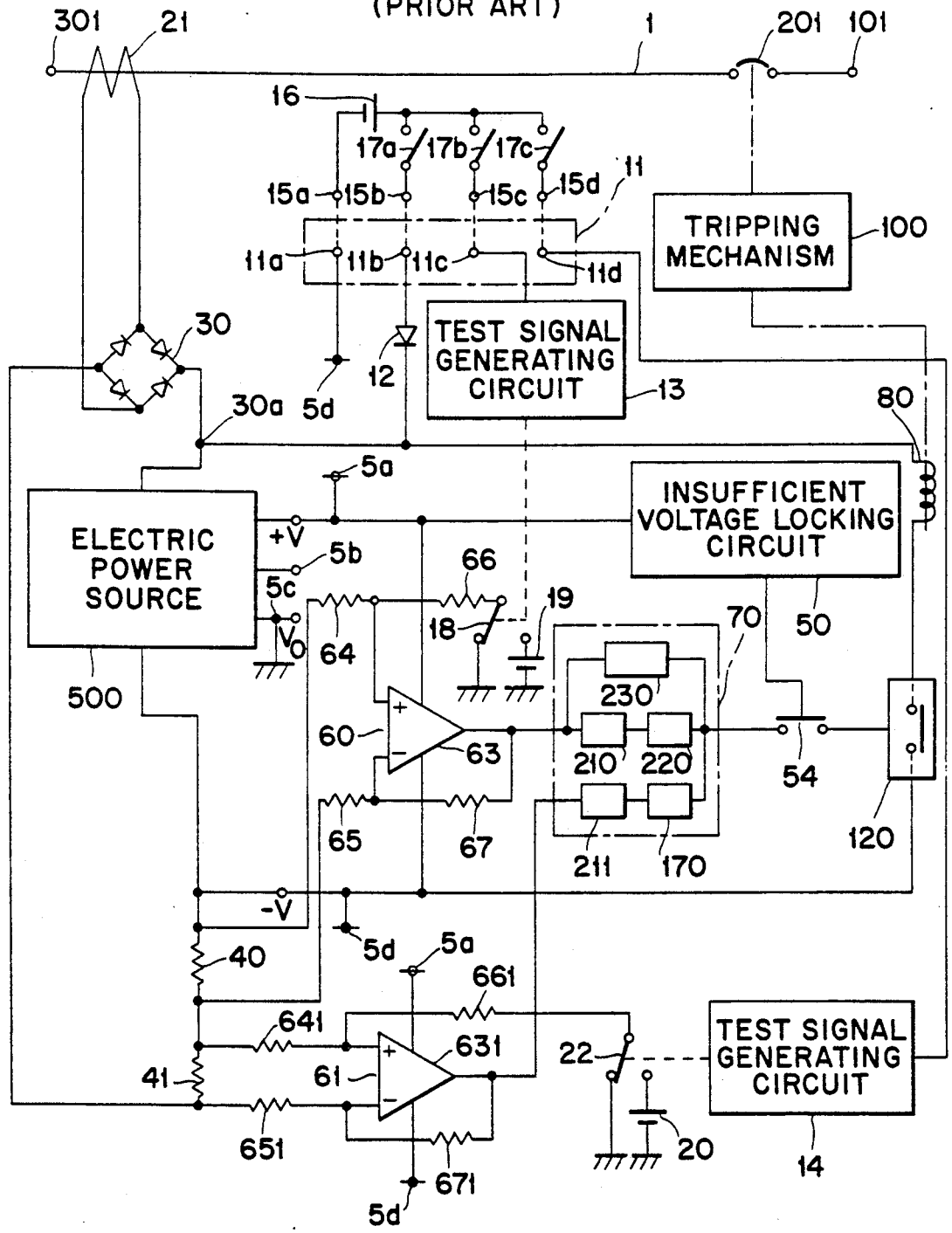
FIG. 3 is the circuit diagram of the conventional circuit breaker having tripping test function.

A preferred embodiment of a circuit breaker with detachable tripping tester in accordance with the present invention is described referring to FIGS. 1 and 2. FIG. 1 is a perspective view showing an external appearance of a part of the circuit breaker with detachable tripping tester in accordance with the present invention. FIG. 2 is a circuit diagram of the circuit breaker with detachable tripping tester in accordance with the present invention. In this embodiment, only a single phase of the power line and a circuit breaker of a single phase are shown for making the description simple, but the actual system has three power lines and three circuit breakers of the same constitution.

In FIG. 1, a detachable tripping tester 25 comprises a switch 17 such as a push button switch, an electric power source 16 such as a battery and a connector plug 15 including female terminals (third and fourth terminals) 15a and 15b. The switch 17, the electric power source 16 and the terminals 15a and 15b are electrically inter-connected by cables 18. An over-current tripping relay 26 is fixed on a front face 35a of a housing 35 of a circuit breaker or a switch box. Male terminals (first and second terminals) 11a and 11b of a connector receptacle 11 are provided on a front face 26a of the relay 26. The connector 15 is to be coupled to the connector 11. And the female terminals 15a and 15b are electrically connected to the male terminals 11a and 11b, respectively.

In FIG. 2, a terminal on electric power side 101 is to be connected to an A.C. electric power source (not shown); and a load break contact 201 is connected to the terminal on the electric power side 101. The A.C. power line 1 is connected between the load break contact 201 and a terminal on load side 301. A current transformer 21 is provided on the A.C. power line 1 at the section between the terminal 101 on electric power side and the terminal 301 on the load side. A full-wave rectifying circuit 30 is connected to secondary output terminals of the current transformer 21 for changing an alternating current flowing on secondary winding of the current transformer 21 into a unidirectional current. The full-wave rectifying circuit 30 consists of known two sets of series connection of diodes. An electric power circuit 500 for outputting a D.C. constant voltage is connected to a positive output terminal of the rectifying circuit 30. The electric power circuit 500 has a positive terminal 5a, a reference voltage output terminal 5b, a grounded middle output terminal 5c and a negative output terminal 5d.

The negative terminal 5d of the electric power circuit 500 is connected to a terminal of a resistor 40 for current detection. The other terminal of the resistor 40 is connected to a terminal of another resistor 41 for current detection. The other terminal of the resistor 41 is connected to the negative terminal of the rectifying circuit 30.

Each differential amplifier 60 or 61 consists of an operational amplifier 63 or 631 and resistors 64, 65, 66 and 67 or 641, 651 and 671. Electric power is supplied to the differential amplifiers 60 and 61 from the electric power circuit 500. Input terminals of the differential amplifiers 60 and 61 are connected to both terminals of the resistors 40 and 41, respectively. The differential amplifiers 60 and 61 convert the voltage drops by the resistors 40 and 41, respectively, to a voltage signal which is based on a middle voltage $V_0$ of the electric power source 500. The relation of gains of the differential amplifiers 60 and 61 are selected such that the gain of the one nearer to the electric power circuit 500 is smaller than that of the other. In this embodiment, the relation is concluded that the gain of the differential amplifier 60 is smaller than that of the differential amplifier 61.

A time delay circuit 70 comprises an instant time tripping circuit 230, a short time tripping circuit 220 and a long time tripping circuit 170. Respective output terminals of the instant time tripping circuit 230, the short time tripping circuit 220 and the long time tripping circuit 170 are connected commonly to an output terminal 70a of the time delay circuit 70. The instant time tripping circuit 230 is connected to the output terminal of the differential amplifier 60. And a series connection of a peak value conversion circuit 210 and the short time tripping circuit 220 and another series connection of an effective value conversion circuit 211 and the long time tripping circuit 170 are connected parallel to the instant time tripping circuit 230. The instant time tripping circuit 230 outputs a trip signal at the time when the input signal thereto becomes above a first predetermined value. The short time tripping circuit 220 outputs a trip signal shortly after the input of peak value from the peak value conversion circuit 210 exceeds a second predetermined value. The long time tripping circuit 170 outputs a trip signal after a predetermined long time period after the input of effective value from the effective value conversion circuit 211 exceeds a third predetermined value.

One end of an electromagnetic tripping coil 80 is connected to a positive terminal of the rectifying circuit 30. A switching circuit 120 is connected between the other end of the electromagnetic tripping coil 80 and the negative terminal 5d of the electric power circuit 500. The electromagnetic tripping coil 80 is mechanically linked to the tripping mechanism 100 for opening the load break contact 201 provided on the A.C. power line 1 and is excited for driving the tripping mechanism 100 when the switching circuit 120 turns on.

An insufficient-operation locking circuit 50 for locking the tripping operation when the voltage of the electric power circuit 500 is insufficient (i.e. below a predetermined voltage) has an output switch 54 which is connected between the switching circuit 120 and the time delay circuit 70.

The connector 11 which is provided on the front face 26a of the relay 26 as shown in FIG. 1 has the terminals 11a and 11b. The terminal 11a is connected to the negative terminal 5d of the electric power circuit 500. The terminal 11b is connected to the anode of a diode 12 which is for preventing reverse current to the terminal 11b. And the cathode of the diode 12 is connected to the positive terminal 30a of the rectifying circuit 30.

The terminals 15a and 15b of the connector 15 are detachably connected to the terminals 11a and 11b. The terminal 15a is connected to the negative electrode of the D.C. electric power source 16. The other terminal 15b is connected to the switch 17. The switch 17 is connected to the positive electrode of the D.C. electric power source 16.

Tripping test operation of the above-mentioned circuit breaker with detachable tripping tester in accordance with the present invention is described.

At first, the connector plug 15 is coupled to the connector receptacle 11 and thereby the terminals 15a and 15b are respectively connected to the terminals 11a and 11b.

Under the condition that the load break contact 201 is opened and any current does not flow on the A.C. power line 1, when the switch 17 is closed, a predetermined D.C. voltage, for example, 24 V is applied to the electric power circuit 500 from the D.C. power source 16, and a direct current (D.C.) flows on the electric power circuit 500.

At this time, the predetermined D.C. voltage from the D.C. power source 16 is applied to the test signal generating circuit 13. The test signal generating circuit 13 outputs a test signal for turning on the switch 18. When the switch 18 is turned on, a predetermined D.C. voltage from the first D.C. power source 19 is applied to the positive input terminal of the differential amplifier 60 as an input signal and the output signal of the differential amplifier 60 is applied to the time delay circuit 70. Hereupon, since the level of the output signal of the differential amplifier 60 is high, the instant time tripping circuit 230 issues an instant trip signal as a quasi over-current signal of the time delay circuit 70 to make an instant trip of the tripping mechanism 100.

Furthermore, in the above-mentioned embodiment, under condition that the load break contact 201 is closed and the A.C. power line 1 is electified, even when each of the contact 11a or 11b of the connector 11 happens to be short-circuited, unexpected accident which badly affects the instant time tripping characteristic or the long time tripping characteristic does not occur, because the diode 12 for preventing the reverse current is connected between the contact 11b and the positive terminal of the rectifying circuit 30.

Moreover, the above-mentioned circuit breaker with detachable tripping tester in accordance with the present invention has another advantage in that the detachable tripping tester 25 can be used as a remote control device for manual tripping of the circuit breaker. Namely, under the normal condition that the load break contact 201 is closed and the A.C. power line 1 is electified to flow current thereon, when the switch 17 is turned on, the test signal generating circuit 13 makes the switch 18 turn on. When the switch 18 turns on, the predetermined D.C. voltage from the D.C. power source 19 is superimposed on the output voltage between the terminals of the resistor 40. And the time delay circuit 70 outputs a signal for turning on the switching circuit 120 for exciting the tripping coil 80. Thereby, the load break contact 201 is opened by remote controlling.

The above-mentioned embodiment has been described as a circuit breaker for breaking single phase of A.C. power line for simplicity's sake. However, a circuit breaker for breaking double or triple phases of A.C. power lines can be realized by comprising: plural current transformers for converting the currents flowing on the double or triple phases of A.C. power lines to output currents of secondary winding in proportion to predetermined ratio of current transformation; plural rectifying circuits for converting the alternating secondary output current of the current transformers to unidirectional currents; plural (two or three) sets of series connections of two resistors which are also connected to an electric power circuit whereon the output current of the rectifying circuits flow; and plural sets of differential amplifier, test signal generating circuit, switch and so on corresponding to respective resistors. Thereby, the circuit breaker for plural phases of A.C. power lines has checking function of the tripping characteristics similar to the afore-mentioned embodiment.

Hereupon, the detachable tripping tester 25 has the simplest constitution having only the switch 17 and the D.C. power source 16 such as a battery. Therefore, only one detachable tripping tester 25 can be used for testing the tripping mechanism of all the circuit breaker for all phases.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A circuit breaker for breaking a connection in an AC power line comprising:
   a housing;
   a rectifying circuit coupled to said AC power line for producing a DC voltage at a positive output terminal thereof;
   an electric power source connected to said positive output terminal and provided in said housing, said electric power source having a negative terminal and a positive terminal;
   a first breaker terminal and a second breaker terminal provided on a surface of said housing, said first breaker terminal being connected to said negative terminal of said electric power source;

a diode having its anode connected to said second breaker terminal and its cathode connected to said positive output terminal of said rectifying circuit;

a tripping coil and a first switch connected in series between said negative and positive terminals;

a quasi over-current signal generating means connected to said second breaker terminal for closing said switch in response to a predetermined DC voltage signal being applied to said second terminal; and a tripping tester having a first tester terminal which is detachable from and attachable to said first breaker terminal, a second tester terminal which is detachable from and attachable to said second breaker terminal, and a DC power source and a tester switch connected in series between said first and second tester terminals.

2. A circuit breaker with detachable tripping tester in accordance with claim 1, wherein said D.C. power source is a battery and said tester switch is a push button switch.

* * * * *